United States Patent Office 2,916,480
Patented Dec. 8, 1959

2,916,480

ALIPHATIC MONOOLEFIN POLYMERIZATION METHOD

Stanley P. Rowland, Cincinnati, and Ervin G. Pritchett, Silverton, Ohio, assignors to National Distillers and Chemical Corporation, New York, N.Y., a corporation of Virginia No Drawing. Application May 29, 1958
Serial No. 738,609

10 Claims. (Cl. 260—94.9)

This invention relates to a process for polymerizing a monoolefin in the presence of a combination catalyst system and, more particularly, to polymerization of a monoolefin in the presence of a combination catalyst system pretreated under conditions whereby there is obtained an increased yield of the desired polymer product.

The present invention is based on the discovery that, in the polymerization of a monoolefin, such as ethylene, propylene, etc. using a combination catalyst of an organotin compound and a metal compound as defined more fully hereinafter, substantial unexpected increases in yield of the polymer product can be obtained if the combination catalyst is subjected to a pretreatment, as defined hereinafter, at an elevated temperature.

In practice of this invention, the tin-containing component is preferably a hydrocarbon derivative of tin including aryl-, alkyl-, and cycloalkyl-tin compounds and mixtures thereof, with specific examples thereof being substances such as tetraphenyltin, tetraethyltin, tetramethyltin, tetraisopropyltin, tetravinyltin, hexaphenyldistannoxane, and hexaethyl distannoxane, as well as mixed alkyls and aryls of tin-tin oxides. As the other component, there can be used a derivative of a metal from the group consisting of titanium, zirconium, hafnium and thorium, and particularly the halides thereof. Although the chlorides of such metals are preferred, and particularly titanium tetrachloride and trichloride, other halides such as the bromides, iodides and fluorides may be used with specific illustrations thereof being zirconium dibromide, hafnium triiodide, titanium tetrafluoride, thorium tetraiodide, titanium oxyfluoride, etc. Still other derivatives of such metals include those corresponding to a tetrahalide thereof in which from one to four of the halide atoms is replaced with an OR group in which R is a hydrocarbon group. Illustrative thereof are compounds such as butoxy titanium trichloride, ethoxy, butoxy titanium dichloride, ethoxy dibutoxy titanium chloride, dibutoxy zirconium dichloride, triethoxy zirconium bromide, etc.

The total quantity of the combination catalyst that may be used can be varied within a wide range but, generally, is within the range of from about 0.01 to about one percent or more, based on the weight of the olefin subjected to polymerization. The proportional amounts of the components of the combination catalyst can also be varied over a wide range and, preferably between 0.5 to 2 moles of the hydrocarbon tin compound per mole of the stated halide.

The compounds which may be polymerized according to the present invention consists, generally, of hydrocarbons such as the monoolefins containing from two to six carbon atoms that are polymerizable when contacted with the aforedefined combination catalyst under polymerizing conditions of temperature and pressure. Specific examples of such polymerizable hydrocarbons include ethylene, propylene, butene-1, propene-1, etc.

For effecting the desired polymerization of the polymerizable hydrocarbon, a temperature within the range of 100 to 300° C. is generally employed but, preferably, from about 150 to 250° C. As to pressure, the polymerization may be effected at substantially atmospheric but, preferably, an elevated pressure of from about 100 to about 1000 p.s.i. is used.

The polymerization reaction is carried out either in batch, semi-continuous, or continuous operations. Most conveniently, and in the preferred embodiments, the process is carried out in a diluent or liquid reaction medium, the amount not being unduly critical, but it should be at least sufficient to permit effective agitation and, preferably, to hold the major portion of the polymer in suspension. Organic solvents and/or diluents of the organic hydrocarbon class such as petroleum ether, pentane, cyclopentane, the hexanes, cyclohexanes, heptane, mineral spirits, and mixtures of these materials can be used. It is preferred that the material used be essentially free of impurities which may react to destroy catalyst activity or which copolymerize with the olefin, that is appreciable quantities of materials such as alcohols and unsaturates should be preferably absent. Thus, the diluent should essentially consist of one or more inert saturated hydrocarbons, that is, hydrocarbons devoid of olefinic unsaturation.

For this improved process, the polymerizable hydrocarbon may be used in substantially pure form or there may be used a mixture containing major quantities thereof, provided no impurities are present in amounts which will destroy the catalyst and/or contaminate the polymer products. For instance, ethylene obtained by the cracking of hydrocarbon streams is satisfactory if acetylenic materials are not present in more than trace amounts.

In carrying out the herein described polymerization process, it is preferable and highly desirable to maintain the polymerization zone free of extraneous reactive gases. This can be done by keeping the reactor blanketed at all times with an inert gas, for instance, operating with an inert gas such as nitrogen, argon and helium. Preferably, the reactor and its contents are blanketed with the polymerizable substance (e.g., ethylene gas) to avoid unnecessary dilution of the reactor contents with inert gases.

In accordance with this invention, the polymerization of olefins is carried out in presence of the aforesaid combination catalyst that has been subjected to a pretreatment at an elevated temperature of above 100° C. in presence of an "active" metal and hydrogen. By use of such pretreated combination catalysts, it has been found that materially increased yields of the desired polymers are obtained as compared to comparable polymerization reactions using the combination catalyst in absence of such a pretreatment.

More specifically, the pretreatment employed for practice of this invention is carried out at a temperature up to about 300° C. but, preferably, at from about 150 to about 250° C. The treatment may be carried out over a substantially wide range of time but, usually, a period of from about 0.1 hour to about four hours is satisfactory with a more preferred period being from about 0.3 to about two hours, shorter times being required at higher temperatures.

The "active" metal, in the presence of which the pretreatment is carried out may broadly be defined as a metal effective as a hydrogenation catalyst with particularly suitable examples thereof being nickel, cobalt, iron, platinum, palladium, etc.

However, and although such metals that are known to be effective hydrogenation catalysts perform satisfactorily for the purpose of this invention, the function of such metals in practice of this invention is not known.

For example, in the use of TiCl₄ in absence of the tin compound and pretreatment of the TiCl₄ with Raney cobalt in presence of hydrogen, no polymerization was found to occur.

As aforesaid, although the function of hydrogen in practice of this invention is not known, its presence is necessary. For example, when argon gas was substituted for hydrogen gas in the pretreatment step, subsequent yields in the polymerization step were considerably decreased. More specifically, the pretreatment employed for the practice of this invention involves the use of a hydrogenation catalyst in an amount equivalent to 0.01 to 100 percent, but preferably 10.0 to 40.0 percent, of the titanium-containing group metal component of the catalyst in combination with hydrogen gas at pressures from atmospheric to 1000 p.s.i.g., but preferably from about 100 to 500 p.s.i.g.

In order to further describe the invention, the following embodiments are set forth for purposes of illustration and not limitation. In the examples, runs have been included using the defined catalyst combination in absence of the pretreatment embodied herein for purposes of comparison to illustrate the marked improvement obtained by practice of this invention.

EXAMPLE 1

A

Four hundred milliliters of purified heptane, 4.6 grams (0.0108 mole) of tetraphenyltin and 1.73 grams (0.009 mole) of titanium tetrachloride were sealed in a stirred reactor under an atmosphere of argon. Ethylene (which by analyses contained 1000 p.p.m. by volume water, 30 p.p.m. acetylene, 12 p.p.m. carbon monoxide, 8 p.p.m. oxygen and 50 p.p.m. hydrogen) was introduced to a pressure of 100 p.s.i.g., the stirrer was turned on and the reactor heated. At about 120° C. the pressure reached 170 p.s.i.g. and then began to decrease, indicating a consumption of ethylene. Fresh ethylene was added as the pressure dropped and agitation was continued for a period of 1.75 hours. The product was removed and, after purification, weighed 18 grams and had a softening point of 132° C. The molecular weight of this product, estimated by reduced viscosity measurements, was 350,000 (reduced viscosity of 0.422).

B

Four hundred milliliters of purified heptane, 4.6 g. of tetraphenyltin and 1.73 grams of titanium tetrachloride were sealed in a stirred reactor. Argon was introduced to a pressure of 60 p.s.i.g. The mixture was stirred and heated. When the reactor temperature reached 190° C., the pressure had increased to 133 p.s.i.g. Ethylene (equivalent by analyses to that of Example 1–A) was then introduced until the total pressure was 520 p.s.i.g. The pressure decreased rapidly; more ethylene was introduced as necessary to keep the reactor pressure at 400 to 500 p.s.i.g. Reaction was continued at a temperature of 180 to 192° C. After a two-hour period of reaction, the product was isolated as in Example 1; it weighed 20.8 grams, had a softening point of 127° C. and exhibited an average molecular weight of about 55,000 (reduced viscosity of 0.132).

C

Four hundred milliliters of n-heptane, 4.6 g. of tetraphenyltin, 1 ml. of titanium tetrachloride and 0.5 g. of fresh Raney cobalt (under heptane) were charged to an autoclave. Hydrogen was pressured into the reactor and agitation was begun. The mixture was raised to 195° C. (600 p.s.i.g. of hydrogen) and then allowed to cool slowly overnight. The hydrogen was exhausted from the autoclave and was replaced with ethylene (equivalent by analysis to that of Example 1–A). Polymerization was conducted at 100–122° C. and 300–400 p.s.i.g. of ethylene for 1.25 hours. The polyethylene, which was isolated as described in foregoing examples, weighed 68 grams and exhibited a softening point of 117° C. and a reduced viscosity of 0.266.

The following tabulation sets forth the yields of polyethylene (in grams/hr.) obtained from the foregoing runs.

| | Polymerization Reaction Conditions | | | Yield of Polymer |
|---|---|---|---|---|
| | °C. | P.s.i.g. | Hrs. | |
| A—Untreated catalyst | 105–133 | 200–550 | 1.75 | 10.3 |
| B—Untreated catalyst | 180–190 | 500 | 2 | 10.4 |
| C—Treated catalyst | 100–122 | 300–400 | 1.25 | 54.5 |

EXAMPLE 2

A

Four hundred milliliters of n-heptane, 4.6 g. of tetraphenyltin, 1 ml. of titanium tetrachloride and 0.5 g. of fresh Raney cobalt (under heptane) were charged to an autoclave. Hydrogen was pressured into the reactor and agitation was begun. The mixture was raised to 110° C. (600 p.s.i.g. of hydrogen) and then allowed to cool slowly overnight. The hydrogen was exhausted from the autoclave and was replaced with ethylene (equivalent by analysis to that of Example 1–A). Polymerization was conducted at 100–120° C. and 300–400 p.s.i.g. of ethylene for 2 hours. The polyethylene, which was isolated as described in foregoing examples, weighed 14 grams.

B

Example 2–A was repeated except that the initial treatment with hydrogen was conducted at 195° C. The polymerization was carried out at 100 to 122° C. and 300–400 p.s.i.g. of ethylene for 1.25 hours. The polyethylene weighed 68.0 grams and exhibited a softening point of 117° C. and a reduced viscosity of 0.266.

C

Four hundred milliliters of n-heptane, 4.6 g. of tetraphenyltin, 1 ml. of titanium tetrachloride and 0.5 g. of fresh Raney cobalt (under heptane) were placed in a one-liter autoclave. Hydrogen gas was pressured into the reactor and the mixture was stirred and heated to 220° C. and 600 p.s.i.g. The reactor was then allowed to cool slowly overnight. Hydrogen was released and replaced by ethylene gas (equivalent by analysis to that of Example 1–A). The mixture was stirred and heated at 100 to 123° C. and 300–400 p.s.i.g. for 2.75 hours. The polyethylene which was produced weighed 80.5 grams and exhibited a softening point of 120° C. and a reduced viscosity of 0.295.

The following tabulation sets forth the yields of polyethylene (in grams/hr.) obtained from the foregoing runs.

| | Polymerization Reaction Conditions | | | Yield of Polymer | Remarks |
|---|---|---|---|---|---|
| | °C. | Psig | Hrs. | | |
| A | 100–120 | 400 | 2 | 7 | Temperature of pretreatment too low (100° C.) |
| B | 100–122 | 400 | 1.25 | 54.5 | |
| C | 100–123 | 400 | 2.75 | 29.2 | |

EXAMPLE 3

A

Four hundred milliliters of n-heptane, 4.6 g. of tetraphenyltin and 1 ml. of titanium tetrachloride were placed in a one-liter autoclave. Hydrogen gas was introduced and the mixture was stirred and heated to 200° C. and 500 p.s.i.g. (of hydrogen). The mixture was cooled and hydrogen was released and flushed out with ethylene gas (equivalent by analysis to that of Example 1–A). The mixture was reheated to 100–126° C. and 390 to 530 p.s.i.g. of ethylene for 1.5 hours. The polyethylene product weighed 28.2 grams and exhibited a softening point of 132° C.

B

Four hundred milliliters of n-heptane, 4.6 g. of tetraphenyltin, 1 ml. of titanium tetrachloride and 0.5 g. of fresh Raney cobalt (under heptane) were charged to an autoclave. Hydrogen was pressured into the reactor and agitation was begun. The mixture was raised to 195° C. (600 p.s.i.g. of hydrogen) and then allowed to cool slowly overnight. The hydrogen was exhausted from the autoclave and was replaced with ethylene (equivalent by analysis to that of Example 1-A). Polymerization was conducted at 100–122° C. and 300–400 p.s.i.g. of ethylene for 1.25 hours. The polyethylene weighed 68.0 grams and exhibited a softening point of 117° C. and a reduced viscosity of 0.266.

C

Four hundred milliliters of dry, purified n-heptane, 4.6 g. of tetraphenyltin, 1.7 g. of titanium tetrachloride and 0.5 g. of Raney nickel catalyst (under heptane) were placed in a stirred, one-liter autoclave. Hydrogen gas was introduced and the mixture was stirred and heated to 200° C. and 500 p.s.i.g. The mixture was then cooled below 50° C., hydrogen was released and the autoclave was flushed with ethylene gas (equivalent by analysis to that of Example 1-A). Ethylene gas was introduced to 250 p.s.i.g. at 46° C. and the mixture was stirred and heated. Ethylene pressures were maintained at 250–500 p.s.i.g. and the reactor was heated at 90 to 136° C. for 1.3 hours. The reaction was then interrupted and the mixture treated with methanol and filtered. The solids obtained were slurried successively with methanolic hydrochloric acid, methanol, water, methanol and acetone. The solids were then dried providing a solid polyethylene product weighing 59.7 grams and having a softening point 128° C. and reduced viscosity of 0.246.

The following tabulation sets forth the yields of polyethylene (in grams/hr.) obtained from the foregoing runs.

| | Polymerization Reaction Conditions | | | Polymer Yield (grams/hr.) |
|---|---|---|---|---|
| | °C. | P.s.i.g. | Hrs. | |
| A—Untreated catalyst | 100–134 | 400–530 | 1.25 | 18.8 |
| B—Treated catalyst | 100–122 | 300–400 | 1.25 | 54.5 |
| C—Treated catalyst | 100–126 | 380–500 | 1.3 | 45.8 |

In determining properties of the polymer products, the determinations were made in accordance with the following:

*Molecular weights.*—Molecular weights were determined from the intrinsic viscosity of the polyethylene products (tetralin) at 105° C. The equation relating intrinsic viscosity and molecular weight is:

$$(n) = 1.35 \times 10^{-4} M^{0.63}$$

This relationship was developed by Harris [I. Harris, J. Poly. Sci., 8, 353 (1952)] who measured viscosities at 75° in xylene. These polymers cannot be handled under these conditions because of their limited solubilities. In theory, however, the intrinsic viscosity is independent of solvent and temperature.

*Softening points.*—Because of the high molecular weight and relatively broad melting range of the majority of the polyethylene obtained, true melting points cannot be directly determined. Thus, the initial softening points were recorded. The softening point was determined by placing the specimen on a melting block and slowly increasing the temperature while constantly working the sample with a small spatula. The softening point was taken at the temperature at which a variety of properties such as general appearance, degree of granulation, cohesiveness, and gumminess underwent change at the greatest rate.

While there are above disclosed but a limited number of embodiments of the process of the invention herein presented, it is possible to produce still other embodiments without departing from the invention concept herein disclosed, and it is desired therefore that only such limitations be imposed on the appended claims as are stated therein.

What is claimed is:

1. In a catalytic process for polymerizing a relatively low molecular weight aliphatic monoolefin to a normally solid polymer using as the polymerization catalyst a combination of (1) an organotin compound and (2) a group IVb metal halide in a ratio of from about 0.5 to about 2 moles of the organotin compound per mole of the group IVb metal halide, the improvement which comprises pretreating said combination catalyst by heating at from above about 100 to about 300° C. in the presence of hydrogen and a metal hydrogenation catalyst for a period of time sufficient to increase the activity of said catalyst in polymerizing said monoolefin.

2. A process, as defined in claim 1, wherein the combination catalyst is pretreated at about 150 to about 250° C. for from about 0.3 to about 2 hours.

3. A process, as defined in claim 1, wherein the polymerization of the monoolefin is carried out at a temperature of from about 100 to about 300° C.

4. A process, as defined in claim 3, wherein the polymerization is carried out at a pressure of from substantially atmospheric to about 1000 p.s.i.g.

5. A process, as defined in claim 1, wherein the combination catalyst is used, for the polymerization reaction, in an amount of from about 0.01 to about one percent based on the weight of the monoolefin.

6. A process, as defined in claim 1, wherein the tin compound is tetraphenyl tin and the group IVb metal compound is titanium tetrachloride.

7. A process, as defined in claim 1, wherein the monoolefin is ethylene.

8. In a catalytic process for polymerizing ethylene at from about 100 to about 300° C. at a pressure of substantially atmospheric to about 1000 p.s.i.g. in the presence of a combination polymerization catalyst comprising a group IVb metal chloride and an organotin compound in a ratio of from about 0.5 to about 2 moles of the tin compound per mole of the group IVb metal chloride to produce a normaly solid polymer of ethylene, the improvement which comprises pretreating said combination catalyst at about 100 to about 300° C. in the presence of hydrogen and a metal hydrogenation catalyst for a period of time sufficient to increase the activity of said catalyst in polymerizing ethylene.

9. A process, as defined in claim 8, wherein the combination catalyst comprises tetraphenyltin and titanium tetrachloride in a ratio of about 0.5 to 2 moles of the tetraphenyl tin per mole of titanium tetrachloride.

10. A process, as defined in claim 8, wherein the hydrogenation catalyst is a metal from the group consisting of nickel, cobalt, iron, platinum and palladium.

References Cited in the file of this patent

FOREIGN PATENTS

| 533,362 | Belgium | May 16, 1955 |
| 1,134,740 | France | Dec. 3, 1956 |
| 1,139,656 | France | Feb. 18, 1957 |